E. FUCHS.
APPARATUS FOR USE IN CALIBRATING AND RIFLING THE BORE OF FIREARMS.
APPLICATION FILED JUNE 28, 1917.

1,394,079.

Patented Oct. 18, 1921.

Inventor.
Ernest Fuchs

E. FUCHS.
APPARATUS FOR USE IN CALIBRATING AND RIFLING THE BORE OF FIREARMS.
APPLICATION FILED JUNE 28, 1917.
1,394,079.
Patented Oct. 18, 1921.
4 SHEETS—SHEET 2.
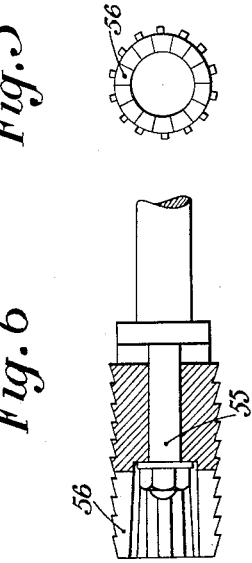
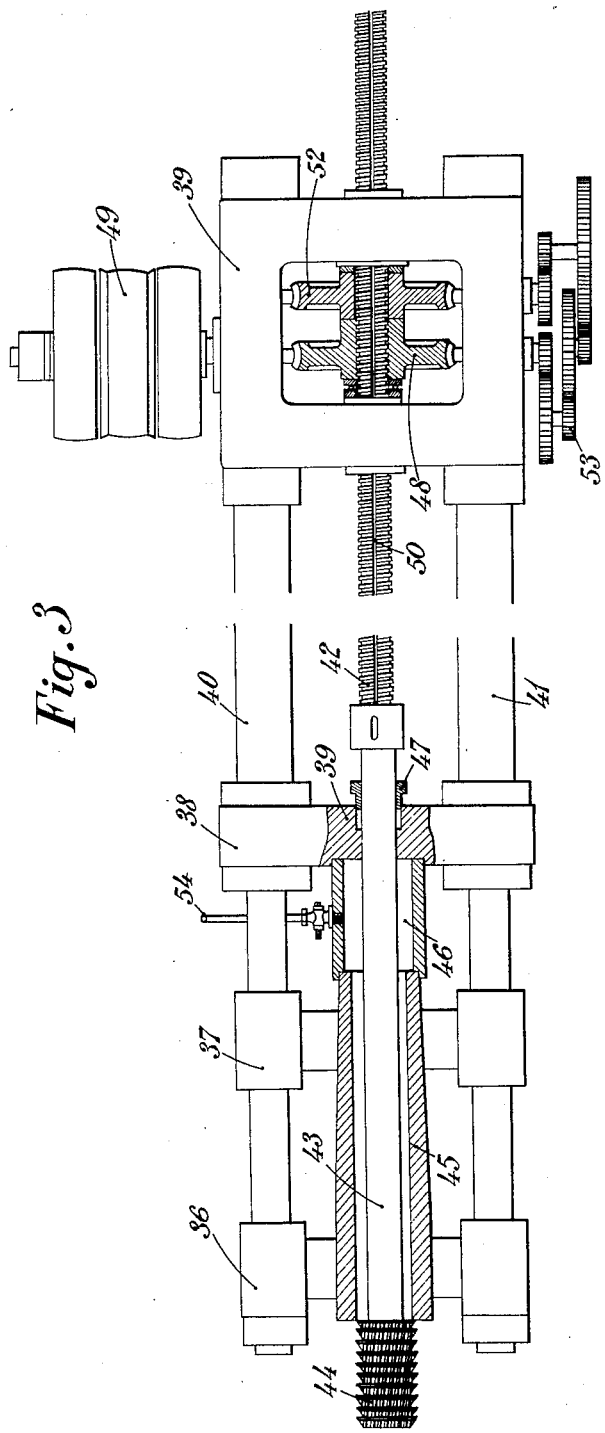
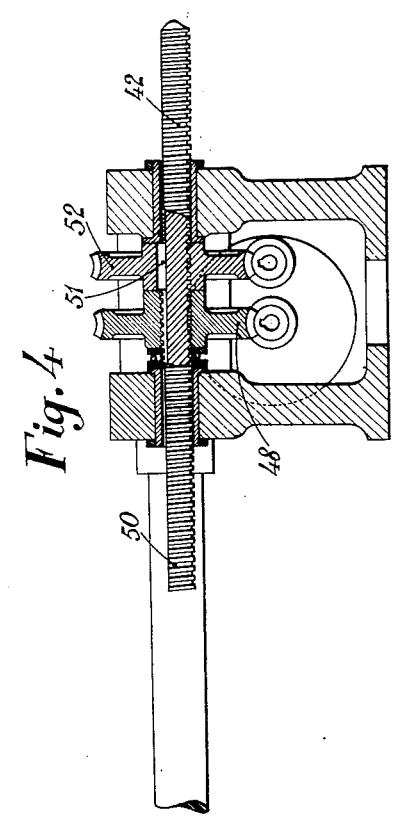

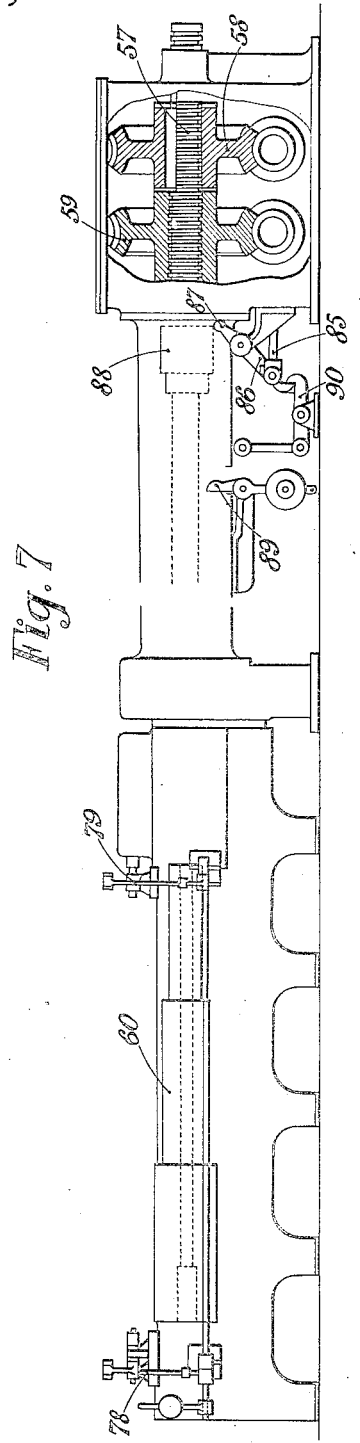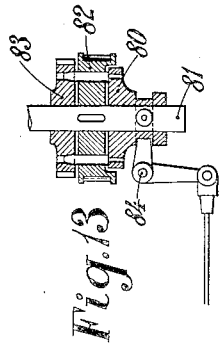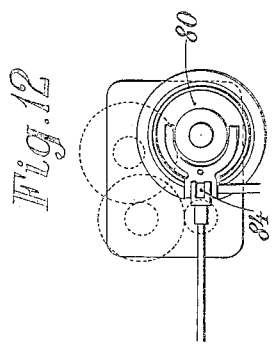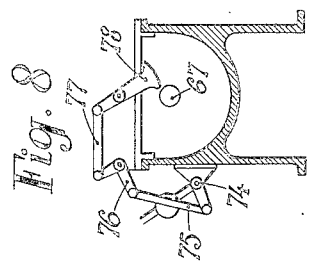

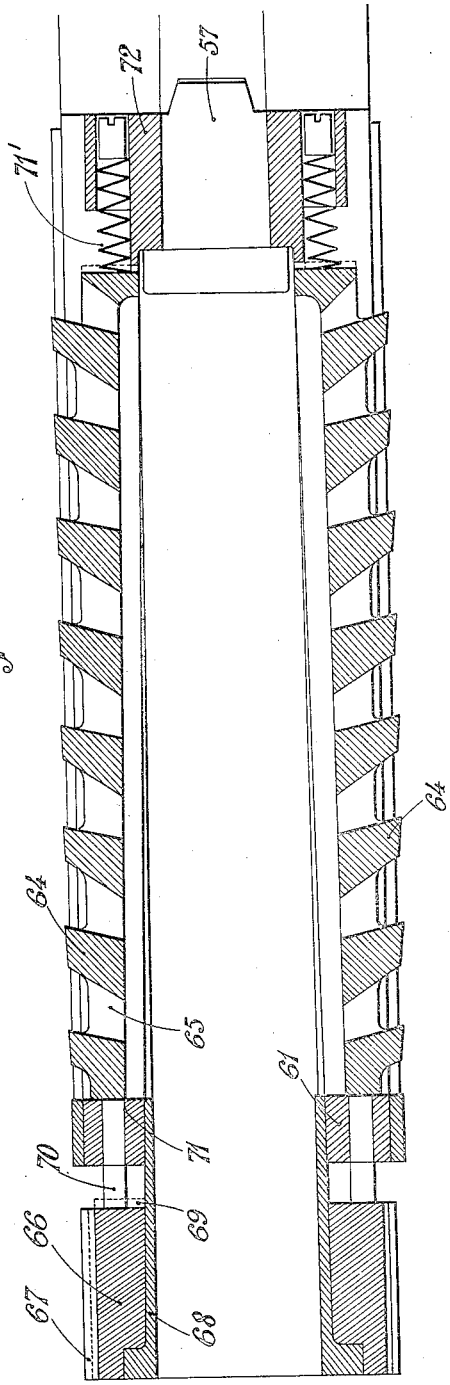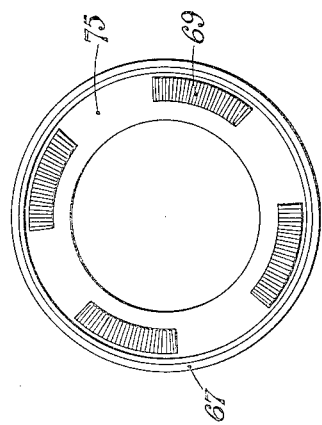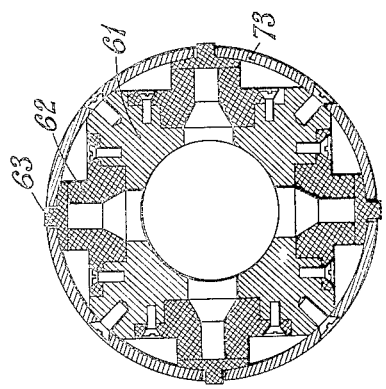

UNITED STATES PATENT OFFICE.

ERNEST FUCHS, OF BILLANCOURT, FRANCE, ASSIGNOR TO LOUIS RENAULT, OF BILLANCOURT, FRANCE.

APPARATUS FOR USE IN CALIBRATING AND RIFLING THE BORE OF FIREARMS.

1,394,079.

Specification of Letters Patent. Patented Oct. 18, 1921.

Application filed June 28, 1917. Serial No. 177,548.

*To all whom it may concern:*

Be it known that I, ERNEST FUCHS, engineer, of 15 Rue Gustave Sandoz, at Billancourt, Department of the Siene, France, citizen of the French Republic, have invented certain new and useful Improvements in an Apparatus for Use in Calibrating and Rifling the Bore of Firearms; and I do hereby declare the following to be a full, clear, and exact description of the invention, such as will enable others skilled in the art to which it appertains to make and use the same.

The present invention relates to an apparatus for use in calibrating and rifling the bore of fire arms, said apparatus offering great rapidity and permitting all the grooves to be cut simultaneously.

The invention comprises a series of tools formed by disks provided with inclined teeth in the case of rifling and without teeth in the case of calibration to pass into the interior of the bore to be rifled or calibrated. The disks are mounted on a spindle which is drawn along by its front end by any suitable means, while the rear end carries a cylinder on which is reproduced a helix the pitch of which is equal to the pitch of the grooves to be made in the bore of the fire arm or gun.

A fixed projection, with or without a roller thereon engages in these grooves in such a way that if the front end of the spindle be moved forward it, as well as the tools which it carries, move forward in the bore of the gun and each tool describes a helix the pitch of which is equal to that of the helix or helixes on the cylinder of the reproducer.

I will describe with reference to the accompanying drawing different constructions of apparatus for carrying out the present invention, but I do not limit myself to the precise construction of apparatus described and illustrated.

Fig. 3 is a plan view of a modification.

Fig. 4 is a part central longitudinal section of the driving mechanism of the spindle carrying shaft.

Figs. 5 and 6 are respectively an end view and a vertical section of a constructional form of a spindle intended for finishing and polishing the grooves.

Fig. 7 is an elevation partly in section of apparatus in accordance with a new modification of the invention.

Fig. 8 is an end view of the same machine.

Fig. 9 is a vertical section through the axis of the modified spindle.

Fig. 10 is a cross section of the spindle.

Fig. 11 is a front view of the tool driving ring.

Figs. 12 and 13 show in front view and section through the axis, a detail of the clutch mechanism of the device for controlling the rotary movement of the spindle.

Figure 1:
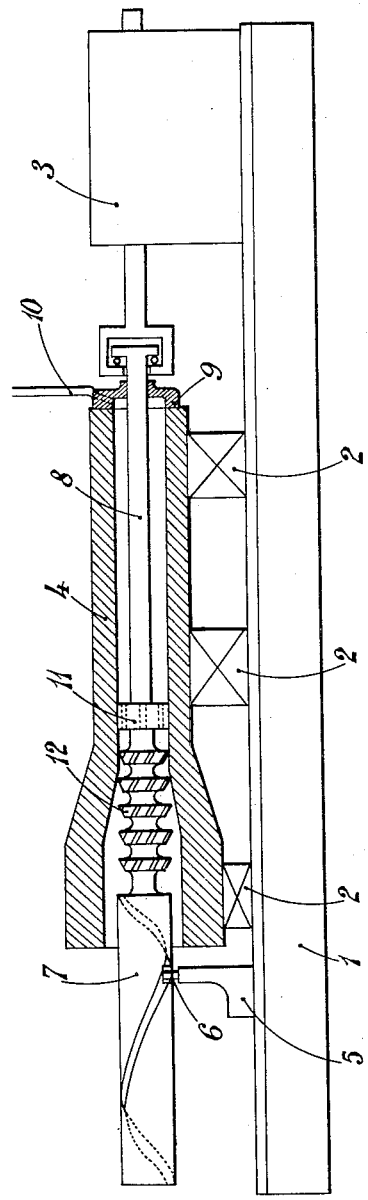
Figure 1 is a side view partly in section of the whole of an apparatus.

Referring to Fig. 1, 1 is a bench on which is fixed the gun or fire arm 4 to be rifled by means of suitable supports 2, on the right hand side of the bench is fixed a machine 3 capable of giving translational movement to the spindle, such movement being rectilinear and horizontal and parallel with the bench. This machine may be driven in any suitable manner.

It has a stroke or travel which is sufficient to allow the complete passage of all the tools in the interior of the bore of the gun or fire arm to be rifled.

On the left of the bench is fixed a support 5 carrying a fixed or stationary projection engaging in a helicoidal groove or grooves of the reproducing cylinder 7 fixed to the rear of the tool spindle 8.

The rod for drawing along the spindle 8 is provided on the end nearest the traction device 3 with a suitable coupling device, which will allow of the spindle rotating while being moved forward.

This rod extends through a plate 9 having a stuffing box. This plate carries an oil supply pipe 10 which allows oil under pressure to be forced into the interior of the bore while the operation is being carried out.

Figure 2:
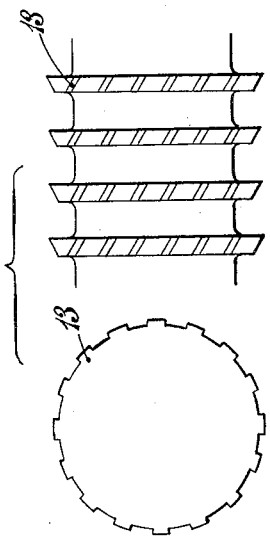
Fig. 2 shows an end view and side view of the tool or tools which cuts or cut the grooves.

The spindle 8 may carry in front of the tools a guide cylinder 11. The cylinder 11, the exterial diameter of which is equal to the internal diameter of the gun or fire arm across the lands is provided with holes to permit of the passage of the oil toward the tools. The tools are represented at 12. They may be of any number, and are formed by disks carrying as many teeth as there are grooves in the bore of the gun or fire arm. The sides 13 of these teeth are cut in helices the pitch of which is equal to that of the grooves of the gun or fire arm as shown in Fig. 2.

The external diameter of the teeth of each tool progressively increases in such a way that the first tool roughs out the grooves, the second tool deepens the grooves thus roughed out and so on until the last tool is reached which ought to finish the groove completely to the desired size.

The rear of the spindle is formed by the cylinder 7 the diameter of which is slightly less than the internal diameter of the bore of the cannon and the external surface of which carries the reproducing helix.

The cylinder 7 carrying the reproducing helix may be, either as long as the bore of the gun or fire arm to be rifled so as to guide the tools constantly, or smaller than the length of the cannon to be rifled so that it simply guides the roughing out of the grooves which can be continued automatically by the engagement of the tools therein and the inclination given to the sides of the teeth.

In order to clear away the material removed during working an abundant injection of oil is made through the pipe 10 which oil passes through the holes in the guide ring 11 and leaves by the rear end of the gun or fire arm after having washed and lubricated all the teeth of the tools.

The same apparatus may be employed for calibrating the bore of a gun or fire arm before rifling. In this case, the tools 12 are then formed of steel disks without teeth the diameter of which increases from the first disks to the last.

By causing these disks to pass through the bore of the cannon to be bored, it is calibrated exactly to the diameter of the last disk.

For this work of calibration a spindle may be either passed through directly without giving it any rotary movement or it may be passed through and a helical rotary movement imparted to it while it is passing through.

According to a modification of the present invention, the apparatus comprises means which permit of the actuating means by a mechanical system which imparts the desired movement to the spindle and permits of the easy evacuation of the turnings or cuttings. This mechanical system is placed in front of the spindle and imparts to the spindle carrying shaft a rotary movement the speed of which corresponds to the pitch of the helix which it is desired to produce and which combined with the longitudinal movement of the spindle carrying shaft causes a helicoidal trajectory to pass through the teeth thereof.

This arrangement of the reproducer system in front of the spindle allows of the apparatus being easily connected up to an arrangement for removing the cuttings or turnings and consisting in injecting into the gun or fire arm a liquid under pressure, which, by escaping between the teeth of the spindle, forces the material removed to the rear of the machine.

Referring to Figs. 3 and 4 the apparatus comprises a number of frames 36, 37, 38, 39 connected together by two strong cross tie rods or bars 40 and 41. A screw 42 is connected by a rod 43 to a spindle 44 carrying the rifling tools. The weapon to be rifled is placed at 45 and is suitably supported on the frames 36 and 37 and its end rests against a sleeve 46 fixed to the frame 38 and a plate 39 having a stuffing box 47 which just allows the rod to pass through. The screw 42 is moved longitudinally by a wheel 48 having a screw threaded hub forming a nut on the screw. This wheel has a rotary motion which is imparted thereto by any suitable means as for example an endless screw as shown in Fig. 3, rotated by means of a set of pulleys 49. The screw 42 is provided along its whole length with a groove 50 in which engages a key 51 rigidly fixed to a wheel 52 adjacent to the wheel 48 and receiving from this wheel 48 a very slow rotary movement through a train of gearing 53. While the screw 42 advances a length equal to the pitch of the helix to be produced, the ratio of reduction of the train of gearing 53 can be adjusted so that the wheel 52 describes a complete revolution. The screw and consequently the spindle which is rigidly attached to it, have a helicoidal movement, the control of this movement taking place during the whole duration of the travel.

Fig. 6 shows a constructional form of spindle which may be more particularly employed. As shown, this spindle is hollowed out at its center at 55 and is provided at its rear part with longitudinal slots 56 for a certain length between the teeth so as to give a certain elasticity to them for the purpose of avoiding raking and collecting of the metal.

This spindle is more particularly intended for the finishing and polishing of the grooves.

The modification shown in Figs. 7 and 8 has for its object to provide an improved apparatus for carrying out of the process whereby the rifling machine is rendered entirely automatic.

According to this modification, a form of spindle is used with extensible teeth which retire when the work is done and the machine is provided with an automatic dividing arrangement making the different grooves.

In the apparatus illustrated in Fig. 7, the spindle carrying shaft is denoted by 57, the wheel which causes this shaft to rotate by 58, the wheel which imparts longitudinal movement thereto by 59. The work 60 to be operated on is placed on the rear portion of the frame of the apparatus. The spindle is represented in Figs. 9, 10 and 11; it comprises a body of steel 61 provided with pieces 62 recessed into the body 61 and forming races or guides on which the tools 63 slide. The tools 63 are formed of a piece of steel of profile tool shape having along its length a series of teeth 64 arranged in a helix and regularly stepped or graded in height. In front of each tooth is a hole 65 to allow of the passage of the cuttings or turnings and the interior of the body 61 is hollow so that the material removed can clear away at the rear. The plane of the races formed by the pieces 62, in which the tool slides is inclined from left to right so that the tool extends beyond it and is in the operative position when its end strikes against the body 61 and is withdrawn or disengaged when pushed toward the right.

The movement of the tools toward the right is effected by means of a ring 66 carrying externally a series of teeth 67 and adapted to rotate upon a part 68 fixed to the body 61. The ring bears on its front face helicoidal inclined surfaces 69 (see Fig. 9) acting on rods 70 fixed to each tool and passing through an opening 71 in the body 61. The tools are constantly pushed back toward the left by springs 71' acting on their front ends, these springs being supported in a sleeve 72 fixed to the spindle carrying shaft 57. By acting upon the series of teeth 67 of the ring 66, it is caused to rotate in its bearing 68 and it is pushed toward the right owing to the helicoidal inclined surfaces 69, the whole of the tools compressing the springs 71'. The tools are thus retired and the spindle can be brought to the rear passing through the bore of the gun or fire arm. The whole spindle is inclosed by a bronze ring 73 which is guided accurately in the bore of the piece to be worked. A movement in the reverse direction imparted to the series of teeth 67 allows the tools 64 to be brought into their operative position.

In Figs. 7 and 8, is shown diagrammatically the arrangement employed for automatically controlling the disengagement and reëngagement of the tools at the end of the stroke.

On one side of the frame of the apparatus is mounted a shaft 74, Fig. 8, which receives, by any suitable mechanism, an oscillatory movement at each end of the travel of the spindle. This oscillatory movement is transmitted by a system of connecting rods 75 and 76 and levers 77 to an oscillating toothed sector 78 the teeth of which engage at each end of the travel of the spindle with the teeth 67 of the ring 66 of the spindle. A sector 79 driven by the same shaft 74 and placed at the front of the machine imparts likewise at the end of each forward travel a movement in the reverse direction to the ring of the spindle.

At the end of the forward travel the oscillatory movement of the sector has the effect of disengaging the tools and at the end of the rearward travel this movement has the effect of reëngaging them.

The automatic dividing device which permits of the different grooves being made is shown in Figs. 12 and 13.

It consists broadly of a disconnecting plate 80 sliding on a shaft 81 driving the wheel 58 which permits a plate 82 keyed on the shaft 81 to be separated from a toothed wheel 83 loose on this shaft and receiving a reduced movement from the wheel 59.

In consequence of the disconnection of the device 80 during a certain fraction of the return travel, the circular movement imparted to the spindle by the wheel 59 is arrested during a certain time, the points of attack of the tools being shifted by a fixed angle corresponding to the period during which the disconnection takes place.

The disconnecting plate 80 is automatically operated by means of a fork 84 connected by a rod 85, to a rock lever 86; provided at its end with a tappet 87 which is pushed back at the end of the forward travel by the stop 88 on the shaft 57. The disconnection is stopped by a tappet 89 pushed back by the stop 88 in its return travel, this tappet operating, through a connecting rod, a lever 90 which disconnects the lever 86 and stops the disconnection.

The teeth of the tools therefore attack the piece on the next travel or stroke after having rotated on themselves during the return travel through an angle corresponding to the value of the rotation not effected on the return in proportion to the disconnection. By suitably moving the support carrying the lever 89, it is possible to modify the distance of the tappets 86 and 87 and the period of disconnection which permits the angle of shift of the tools to be adjusted.

It is obvious that the details of construction of the different devices described may be modified within the scope of the appended claims.

I claim:

1. In an apparatus for rifling gun barrels, the combination with an operating mechanism, of an operated member having formed integral therewith a series of toothed disks of increasing diameter, arranged intermediate the ends thereof, a forwardly extending portion adapted to be connected with the operating mechanism for drawing said member longitudinally through the gun barrel, and a helicoidally grooved cylinder formed on the rear of said operated member, the helicoidal grooves of said cylinder adapted to be engaged by a stationary element extending into said grooves, whereby said cylinder and its associated cutters will be rotated during the longitudinal movement.

2. In an apparatus for rifling gun barrels, the combination with an operating mechanism, of an operated member comprising a series of toothed disks of increasing diameter arranged intermediate the ends thereof, a forwardly extending portion adapted to be connected with the operating mechanism for drawing said member longitudinally through the gun barrel, and a helicoidally grooved cylinder provided on the rear of said operated member, all of the above elements formed integral with said operated member, a stationary element extending into said grooves whereby the disks will be rotated during the longitudinal movement of said member, and means for forcing oil through the gun barrel in a direction opposite to and during the travel of the disks therethrough.

In testimony whereof I affix my signature, in presence of two witnesses.

ERNEST FUCHS.

Witnesses:
CHAS. P. PRESSLY,
ALEXANDRE BERKHOLTZ.